(12) United States Patent
Sasaoka

(10) Patent No.: US 10,371,924 B2
(45) Date of Patent: Aug. 6, 2019

(54) IMAGE DEVICE COMPRISING FILL-LIGHT PROJECTOR, AND AUTOFOCUS METHOD USING IMAGING DEVICE

(71) Applicant: Samsung Electronics Co., Ltd., Suwon-si, Gyeonggi-do (KR)

(72) Inventor: Takayuki Sasaoka, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 15/503,263

(22) PCT Filed: Aug. 10, 2015

(86) PCT No.: PCT/KR2015/008362
§ 371 (c)(1),
(2) Date: Feb. 10, 2017

(87) PCT Pub. No.: WO2016/039528
PCT Pub. Date: Mar. 17, 2016

(65) Prior Publication Data
US 2017/0235096 A1    Aug. 17, 2017

(30) Foreign Application Priority Data
Sep. 11, 2014    (JP) .................................. 2014-185018

(51) Int. Cl.
*G02B 6/34*    (2006.01)
*G02B 7/34*    (2006.01)
(Continued)

(52) U.S. Cl.
CPC .................. *G02B 7/34* (2013.01); *G02B 7/36* (2013.01); *G03B 13/36* (2013.01); *G03B 15/03* (2013.01);
(Continued)

(58) Field of Classification Search
CPC .......... G02B 7/34; G02B 7/36; H04N 5/2354; H04N 5/23212; H04N 5/23245; H04N 5/2256; G03B 15/03; G03B 13/36
See application file for complete search history.

(56) References Cited

U.S. PATENT DOCUMENTS 4,801,963 A    1/1989  Koyama et al.
2009/0161226 A1*  6/2009  Chang .................. H04N 5/2256
                                                    359/649
(Continued)

FOREIGN PATENT DOCUMENTS

EP    0 653 655 A2    5/1995
JP    2527159 B2      6/1986
(Continued)

*Primary Examiner* — Yogesh K Aggarwal
(74) *Attorney, Agent, or Firm* — Jefferson IP Law, LLP

(57) ABSTRACT

Provided is a photographing apparatus having both a phase difference auto-focusing function and a contrast auto-focusing function. Provided is an auxiliary light projector capable of projecting auxiliary light of a pattern suitable for the photographing apparatus. An auxiliary light projector and a photographing apparatus including the auxiliary light projector according to an embodiment of the present disclosure may reduce an auto-focusing time with respect to an object and improve reliability of an auto-focusing function.

19 Claims, 11 Drawing Sheets

(51) Int. Cl.
- *H04N 5/225* (2006.01)
- *H04N 5/232* (2006.01)
- *G02B 7/36* (2006.01)
- *G03B 13/36* (2006.01)
- *G03B 15/03* (2006.01)
- *H04N 5/235* (2006.01)

(52) U.S. Cl.
CPC ......... *H04N 5/2256* (2013.01); *H04N 5/2354* (2013.01); *H04N 5/23212* (2013.01); *H04N 5/23245* (2013.01)

(56) References Cited

U.S. PATENT DOCUMENTS

| | | |
|---|---|---|
| 2012/0169939 A1 | 7/2012 | Kim et al. |
| 2013/0145395 A1 | 6/2013 | Jeong et al. |
| 2014/0160344 A1 | 6/2014 | Kimura |
| 2014/0168662 A1* | 6/2014 | Takabayashi ...... G01B 11/2513 356/610 |
| 2014/0259078 A1 | 9/2014 | Arling |
| 2014/0310748 A1 | 10/2014 | Dureau et al. |

FOREIGN PATENT DOCUMENTS

| | | |
|---|---|---|
| JP | 01-232314 A | 9/1989 |
| JP | 6-094988 A | 4/1994 |
| JP | 06-294988 A | 4/1994 |
| JP | 8-220422 A | 8/1996 |
| JP | 2004-085810 A | 3/2004 |
| JP | 2004-163540 A | 6/2004 |
| JP | 2006-285016 A | 10/2006 |
| JP | 2008-090020 A | 4/2008 |
| JP | 2010-008689 A | 1/2010 |
| KR | 10-2012-0048740 A | 5/2012 |
| KR | 10-2012-0078071 A | 7/2012 |
| KR | 10-2014-0084184 A | 7/2014 |

* cited by examiner

IMAGE DEVICE COMPRISING FILL-LIGHT PROJECTOR, AND AUTOFOCUS METHOD USING IMAGING DEVICE

CROSS-REFERENCE TO RELATED APPLICATION(S)

This application is a U.S. National Stage application under 35 U.S.C. § 371 of an International application filed on Aug. 10, 2015 and assigned application number PCT/KR2015/008362, which claimed the benefit of a Japanese patent application filed on Sep. 11, 2014 in the Japanese Intellectual Property Office and assigned Serial number 2014-185018, the entire disclosure of which is hereby incorporated by reference.

TECHNICAL FIELD

The present disclosure relates to an auxiliary light projector that assists an auto-focusing function of a photographing apparatus that photographs an object, a photographing apparatus including the same, and an auto-focusing method.

BACKGROUND ART

In the case of capturing an image or recording a video using a photographing apparatus such as a camera, a user has a desire to focus on a desired object. Recently, with the popularization of high performance cameras, such as digital single lens reflex (DSLR) cameras or mirrorless cameras, demand for an auto-focus (AF) function is increasing.

In the case of photographing an object using a photographing apparatus, when brightness of the object is low or when contrast of the object is low, brightness and contrast of the object are increased by projecting auxiliary light having a shade pattern onto the object and auto-focusing may be performed. As an auto-focusing method, an auto-focusing method using a phase difference for detecting a distance between lights reached to at least two auto-focus sensors and an auto-focusing method using a contrast method for detecting and evaluating contrasts with respect to an object are known in the art.

DETAILED DESCRIPTION OF THE INVENTION

Technical Problem

The purpose of the present disclosure is, in the case of photographing an object by using a photographing apparatus, when brightness of the object is low or contrast of the object is low, to improve an auto-focusing function by using an auxiliary light projector including a contrast pattern.

Technical Solution

According to an aspect of the present disclosure, there is provided a photographing apparatus having an auto-focusing function, the photographing apparatus including a light emitter, which is mounted on the photographing apparatus and configured to project auxiliary light for assisting with auto-focusing of the photographing apparatus to an object; and an auxiliary light pattern including a plurality of bright pattern lines for transmitting the auxiliary light therethrough to project the auxiliary light to the object and a plurality of dark pattern lines for blocking the auxiliary light to prevent the auxiliary light from reaching the object, wherein the plurality of bright pattern lines and the plurality of dark pattern lines are arranged alternately and repeatedly, and a dark pattern line having a largest width from among the plurality of dark pattern lines and a bright pattern line having a largest width from among the plurality of bright pattern lines are arranged at a center portion of the auxiliary light pattern.

For example, the dark pattern line having the largest width may be arranged at the center of the auxiliary light pattern, and the bright pattern lines having the largest widths may be arranged at both sides of the dark pattern line having the largest width.

For example, the bright pattern line having the largest width may be arranged at the center of the auxiliary light pattern, and the dark pattern lines having the largest widths may be arranged at both sides of the bright pattern line having the largest width.

For example, the dark pattern line having the largest width may be arranged at the center of the auxiliary light pattern, and the plurality of bright pattern lines and the plurality of dark pattern lines may be arranged in a horizontally symmetric formation around the dark pattern line having the largest width.

For example, wherein the bright pattern line having the largest width may be arranged at the center of the auxiliary light pattern, and the plurality of dark pattern lines and the plurality of bright pattern lines may be arranged in a horizontally symmetric formation around the bright pattern line having the largest width.

For example, the plurality of bright pattern lines may have widths different from one another, and the plurality of dark pattern lines may have widths different from one another.

For example, the width of the dark pattern line having the largest width may be greater than the width of the bright pattern line having the largest width.

For example, the width of the dark pattern line having the largest width may be identical to the width of the bright pattern line having the largest width.

For example, the dark pattern line having the largest width and the bright pattern line having the largest width may include a plurality of dark pattern lines having the largest width and a plurality of bright pattern lines having the largest width, respectively, and the plurality of dark pattern lines having the largest width and the plurality of bright pattern lines having the largest width may be arranged in portions of the auxiliary light pattern other than the center portion of the auxiliary light pattern.

For example, the plurality of bright pattern lines and the plurality of dark pattern lines may be extended in a first direction in an imaging region, and the plurality of bright pattern lines and the plurality of dark pattern lines may be arranged alternately and repeatedly in the imaging region in a second direction perpendicular to the first direction.

For example, the auxiliary light pattern may include a first pattern in which the plurality of bright pattern lines and the plurality of dark pattern lines extending in a first direction in an imaging region are arranged alternately and repeatedly in the imaging region in a second direction perpendicular to the first direction; and a second pattern in which the plurality of bright pattern lines and the plurality of dark pattern lines extending in the second direction in the imaging region are arranged alternately and repeatedly in the imaging region in the first direction, wherein the first pattern and the second pattern may intersect with each other perpendicularly.

For example, the plurality of bright pattern lines and the plurality of dark pattern lines may be extended in a diagonal direction in an imaging region and may be arranged alternately and repeatedly to intersect with each other.

For example, the auxiliary light pattern may include a first pattern in which the plurality of bright pattern lines and the plurality of dark pattern lines extending in a first diagonal direction in an imaging region are arranged alternately and repeatedly in the imaging region in a second direction intersecting with the first diagonal direction; and a second pattern in which the plurality of bright pattern lines and the plurality of dark pattern lines extending in the second diagonal direction in the imaging region are arranged alternately and repeatedly in the imaging region in the first diagonal direction, wherein the first pattern and the second pattern may be arranged alternately and repeatedly.

For example, a width of an irradiation pattern of auxiliary light, irradiated to an irradiation location within a pre-set object distance through the dark pattern line having the largest width and the bright pattern line having the largest width, may be smaller than widths of some regions of the object at the irradiation location.

According to another aspect of the present disclosure, there is provided a photographing apparatus having auto-focusing function, the photographing apparatus including a focus adjusting unit, configured to adjust a focus regarding an object to be photographed by the photographing apparatus; and an auxiliary light projector, configured to project auxiliary light for assisting with a focus adjustment by the focus adjusting unit, wherein the auxiliary light projector includes an auxiliary light pattern including a plurality of bright pattern lines for transmitting the auxiliary light therethrough to project the auxiliary light to the object and a plurality of dark pattern lines for blocking the auxiliary light to prevent the auxiliary light from reaching the object, the plurality of bright pattern lines and the plurality of dark pattern lines are arranged alternately and repeatedly, and a dark pattern line having a largest width from among the plurality of dark pattern lines and a bright pattern line having a largest width from among the plurality of bright pattern lines are arranged at a center portion of the auxiliary light pattern.

For example, the focus adjusting unit may include a first auto-focusing unit for adjusting a focus based on a phase difference method and a second auto-focusing unit for adjusting a focus based on a contrast method and may further include a mode controller, which controls switching between a first focus adjusting mode for adjusting a focus by the first auto-focusing unit and a second focus adjusting mode for adjusting a focus by the second auto-focusing unit.

For example, the first auto-focusing unit may adjust a focus based on a brightness difference of a contrast pattern of the center portion of the auxiliary light pattern, and the second auto-focusing unit may adjust a focus based on a brightness difference of a contrast pattern of a portion of the auxiliary light pattern other than the center portion of the auxiliary light pattern.

For example, the first auto-focusing unit may obtain an evaluation value, which is a reliability index for a focus adjustment based on the phase difference method, and transmit the evaluation value to the mode controller, and, when the evaluation value does not exceed a pre-set reference value, the mode controller may switch to the second focus adjusting mode.

According to another aspect of the present disclosure, there is provided a method of performing auto-focus by using an auxiliary light projector mounted on a photographing apparatus, the method including projecting auxiliary light to an auxiliary light pattern included in the auxiliary light projector; adjusting a focus in a first focus adjusting mode based on a brightness difference of a contrast pattern in a first region, which is the center region of the auxiliary light pattern; determining whether a reliability evaluation value regarding a focus adjustment based on the first focus adjusting mode exceeds a pre-set reference value; and, when the reliability evaluation value does not exceed the pre-set reference value, adjusting a focus in a second focus adjusting mode based on a brightness difference of a contrast pattern in a second region of the auxiliary light pattern, wherein the auxiliary light pattern includes a plurality of bright pattern lines, which have widths different from one another and the auxiliary light is transmitted therethrough to project the auxiliary light to the object, and a plurality of dark pattern lines, which have widths different from one another and block the auxiliary light to prevent the auxiliary light from reaching the object.

For example, the first focus adjusting mode may be a focus adjusting mode for adjusting a focus based on a phase difference method, and the second focus adjusting mode may be a focus adjusting mode for adjusting a focus based on a contrast method.

Advantageous Effects of the Invention

According to an embodiment of the present disclosure, there are provided a photographing apparatus including both a phase difference-type auto-focusing function and a contrast-type auto-focusing function and an auxiliary light projector capable of projecting auxiliary light of a pattern suitable for the photographing apparatus, thereby reducing an auto-focusing time and improving reliability of auto-focusing function.

Furthermore, according to an embodiment of the present disclosure, there are provided a photographing apparatus including the auxiliary light projector and a method of adjusting a focus of the photographing apparatus.

MODE OF THE INVENTION

Figure 1:
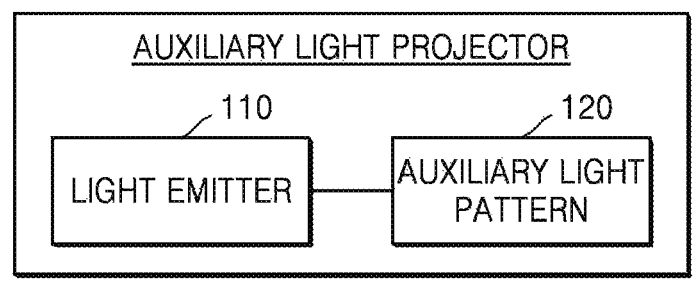
FIG. 1 is a block diagram showing components of an auxiliary light projector according to an embodiment of the present disclosure.

Hereinafter, embodiments of the present disclosure will be described in detail with reference to the accompanying drawings so that those skilled in the art can easily carry out the present disclosure. The present disclosure, however, may be embodied in many different forms and is not limited to the embodiments described herein. In order to clearly describe the present disclosure, portions not related to the description are omitted in the drawings, and the same reference numerals are used throughout the specification to refer to the same or similar parts.

Throughout the specification, when a part is referred to as being "connected" to another part, it is understood that it is not only "directly connected" but may also be "electrically connected". Also, when an element is referred to as "comprising", it means that it can include other elements, and does not exclude other elements unless specifically stated otherwise.

For clarity of description, the following description and drawings may be appropriately omitted and simplified. Hereinafter, the present disclosure will be described in detail with reference to the accompanying drawings.

FIG. 1 is a block diagram showing components of an auxiliary light projector 100 according to an embodiment of the present disclosure.

Referring to FIG. 1, the auxiliary light projector 100 may include a light emitter 110 and an auxiliary light pattern 120. According to an embodiment, the auxiliary light projector 100 may be mounted on a photographing apparatus. The photographing apparatus to which the auxiliary light projector 100 is mounted may be a photographing apparatus having an auto-focusing function. According to an embodiment, the photographing apparatus may adjust a focus by using a phase difference method and/or a contrast method. For example, the photographing apparatus may be a lens-interchangeable mirrorless camera. The auxiliary light projector 100 may project auxiliary light to assist the auto-focusing function performed in the photographing apparatus. The auxiliary light projector 100 may have a light emitter for emitting auxiliary light of a predetermined pattern to assist the auto-focusing function of the photographing apparatus.

The light emitter 110 may be, for example, a light emitting diode (LED). According to an embodiment, the light emitter 110 may emit light according to an electrical signal received from a controller of the photographing apparatus.

The auxiliary light pattern 120 may include an opaque portion for blocking a part of light generated by the light emitter 110 and a transparent portion for transmitting light generated by the light emitter 110. An irradiation pattern of auxiliary light may be determined according to formations of the opaque portion and the transparent portion of the auxiliary light pattern 120.

Hereinafter, the auxiliary light pattern 120 of the auxiliary light projector 100 according to an embodiment of the present disclosure will be described in detail.

Figure 2:
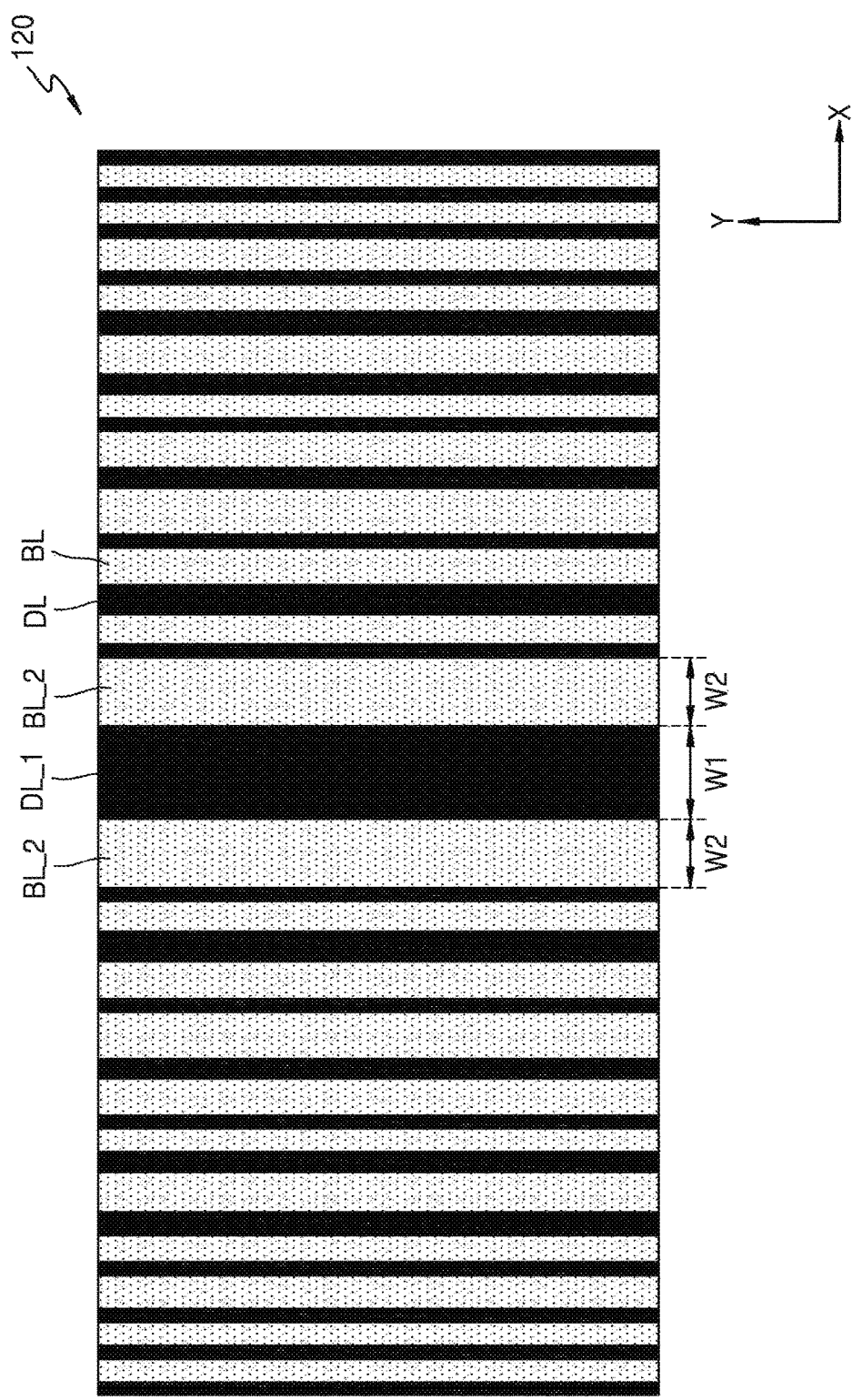
FIG. 2 is a diagram showing an auxiliary light pattern included in the auxiliary light projector according to an embodiment of the present disclosure.

FIG. 2 is a diagram showing the auxiliary light pattern 120 included in the auxiliary light projector 100 according to an embodiment of the present disclosure.

Referring to FIG. 2, the auxiliary light pattern 120 may include a plurality of bright pattern lines BL and a plurality of dark pattern lines DL. In FIG. 2, although not all of the plurality of bright pattern lines BL are indicated with a reference numeral, the plurality of bright pattern lines BL may be shown in the form of transparently hatched lines. Likewise, although not all of the plurality of dark pattern lines DL are indicated with a reference numeral, the plurality of dark pattern lines DL may be shown in the form of blackened lines. The plurality of bright pattern lines BL may be transparent portions to which light generated by the light emitter 110 (see FIG. 1) is irradiated, whereas the plurality of dark pattern lines DL may be opaque portions screening light generated by the light emitter 110.

The plurality of bright pattern lines BL and the plurality of dark pattern lines DL may be alternately and repeatedly arranged in an imaging region. According to an embodiment, the plurality of bright pattern lines BL and the plurality of dark pattern lines DL may extend in a second direction (Y direction) and may be alternately and repeatedly arranged in a first direction (X direction) that is perpendicular to the second direction (Y direction). According to an embodiment, the first direction (X direction) and the second direction (Y direction) may correspond to a horizontal direction and a vertical direction in the imaging region of the photographing apparatus, respectively.

The plurality of bright pattern lines BL and the plurality of dark pattern lines DL may have different widths from one another. A first dark pattern line DL_1 having a largest width from among the plurality of dark pattern lines DL and a second bright pattern line BL_2 having a largest width from among the plurality of bright pattern lines BL may be arranged in the center portion of the auxiliary light pattern 120. The first dark pattern line DL_1 may be formed to have a first width W1, whereas the second bright pattern line BL_2 may be formed to have a second width W2. According to an embodiment, the first width W1 may be greater than the second width W2.

According to an embodiment, the first dark pattern line DL_1 may be extended in the second direction (Y direction) so as to pass the center portion of the auxiliary light pattern 120, whereas the second bright pattern line BL_2 may be extended in the second direction (Y direction) in contact with both sides of the first dark pattern lines DL_1 in the first direction (X direction). A plurality of dark pattern lines DL having different widths W1_1 through W1_$n$ (where n is a natural number and each of W1_1 through W1_$n$ is smaller than or equal to W1) may be arranged at both sides of (that is, outside) the center portion of the auxiliary light pattern 120. Furthermore, a plurality of bright pattern lines BL having different widths W2_1 through W2_$m$ (where m is a natural number and each of W2_1 through W2_$m$ is smaller than or equal to W2) may be arranged outside the center region of the auxiliary light pattern 120. A first width W1 and a second width W2 may be from 2 to 10 times greater than the smallest one of the widths W1_1 through W1_$n$ of the other plurality of dark pattern lines DL and the smallest one of the widths W2_1 through W2_$m$ of the other plurality of bright pattern lines BL, respectively. According to an embodiment, the first width W1 and the second width W2 may be six times greater than the smallest one of the widths W1_1 through W1_$n$ of the other plurality of dark pattern lines DL and the smallest one of the widths W2_1 through W2_$m$ of the other plurality of bright pattern lines BL, respectively.

The widths W1_1 through W1_$n$ of the dark pattern lines DL other than the first dark pattern line DL_1 and the widths W2_1 through W2_$m$ of the bright pattern lines BL other than the bright pattern line BL_2 may not be uniform. However, the present disclosure is not limited thereto, and the widths of the plurality of bright pattern lines BL may be uniform. Similarly, the widths of the plurality of dark pattern lines DL may be uniform. According to an embodiment, the first width W1 and the second width W2 may be identical to each other. According to an embodiment, the plurality of bright pattern lines BL and the plurality of dark pattern lines DL may be arranged symmetrically about the first dark pattern line DL_1.

Although not shown in FIG. 2, according to some embodiments, the second bright pattern line BL_2 may be arranged to pass through the center portion of the auxiliary light pattern 120, and the first dark pattern line DL_1 may be arranged in contact with both sides of the second bright pattern lines BL_2. According to the above embodiment, the width W2 of the second bright pattern line BL_2 may be greater than the width W1 of the first dark pattern line DL_1. According to the above embodiment, the plurality of dark pattern lines DL and the plurality of bright pattern lines BL may be arranged symmetrically about the second bright pattern line BL_2.

Generally, in contrast auto-focus adjustment, the more the bright pattern lines and the dark pattern lines of a contrast pattern are repeated, the more accurately a focus may be adjusted. The reason for this is that, the greater the number of repetitions of the pattern lines and the dark pattern lines of a contrast pattern, the more pieces of data regarding a detected contrast value may be obtained, and thus reliability of a contrast evaluation value regarding an entire image is improved. However, as the number of repetitions of the bright pattern lines and the dark pattern lines of a contrast pattern increases, that is, as the width of each of the bright pattern lines and the dark pattern lines becomes smaller, it becomes difficult to recognize a contrast pattern during a defocusing (initiation of focus adjustment) in a phase difference auto-focus adjustment. On the contrary, as the number of repetitions of the bright pattern lines and the dark pattern lines of the contrast pattern decreases, that is, as the width of each of the bright pattern lines and the dark pattern lines increases, the number of pieces of data regarding a detected contrast value decreases, and thus it becomes difficult to accurately adjust a focus according to a contrast method.

In the embodiment shown in FIG. 2, the first dark pattern line DL_1 having the first width W1 may be arranged to pass through the center portion of the auxiliary light pattern 120, and the second width W2 may be arranged at both sides of the first dark pattern line DL_1. As described above, in the center region of the auxiliary light pattern 120, the one dark pattern line DL_1 having the largest width and the bright pattern line BL_2 having the largest width from among the bright pattern lines BL (smaller than that of the dark pattern line DL) are arranged as a group, and the plurality of bright pattern lines BL and the plurality of dark pattern lines DL having widths smaller than those of the above-stated pattern lines may be alternately arranged at both sides of the group. As a result, a focus may be easily adjusted based on a phase difference method even in a defocusing state. Furthermore, since a photographer often configures a photographing device so that an object is located at the center of an imaging region, there is an advantage in that it is easy to focus on a photographer's desired object. Generally, due to optical characteristics of a lens, the center portion of an imaging region has a higher resolution than a peripheral portion. Therefore, even if the center portion of an imaging region is in defocusing state, phase difference auto-focus adjustment may be easier compared to the peripheral portion of the imaging region.

In the embodiment shown in FIG. 2, the plurality of dark pattern lines DL and the plurality of bright pattern lines BL having widths smaller than those of the first dark pattern line DL_1 and the second bright pattern line BL_2 are arranged at both sides of the center portion of the auxiliary light pattern 120, that is, in the peripheral portion. Therefore, in contrast auto-focus adjustment, a sufficient number of pieces of data regarding a detected contrast value may be obtained, thereby improving accuracy of the focus adjustment.

Furthermore, as described above, in the auxiliary light pattern 120 according to the embodiment of the present disclosure, the first dark pattern line DL_1 and the second bright pattern line BL_2 are arranged in the center portion of the auxiliary light pattern 120, and the plurality of dark pattern lines DL and the plurality of bright pattern lines DL having widths smaller than those of the first dark pattern line DL_1 and the second bright pattern line BL_2 are arranged in the peripheral portion other than the center portion. Therefore, even in a case of telephotographing (that is, even when an imaging region is limited to nearby the center portion of the auxiliary light pattern 120), a contrast portion suitable for phase difference auto-focus adjustment and a contrast portion suitable for contrast auto-focus adjustment may be secured in the imaging region. Furthermore, according to an embodiment, the widths $W1\_1$ through $W1\_n$ of the plurality of dark pattern lines DL and the widths $W2\_1$ through $W2\_m$ of the plurality of bright pattern lines BL are different from one another, and thus, focus detection error may be suppressed.

In the embodiment shown in FIG. 2, the auxiliary light pattern 120 may be implemented by using a film. However, the present disclosure is not limited thereto, and the auxiliary light pattern 120 may be implemented otherwise.

Figure 3A:
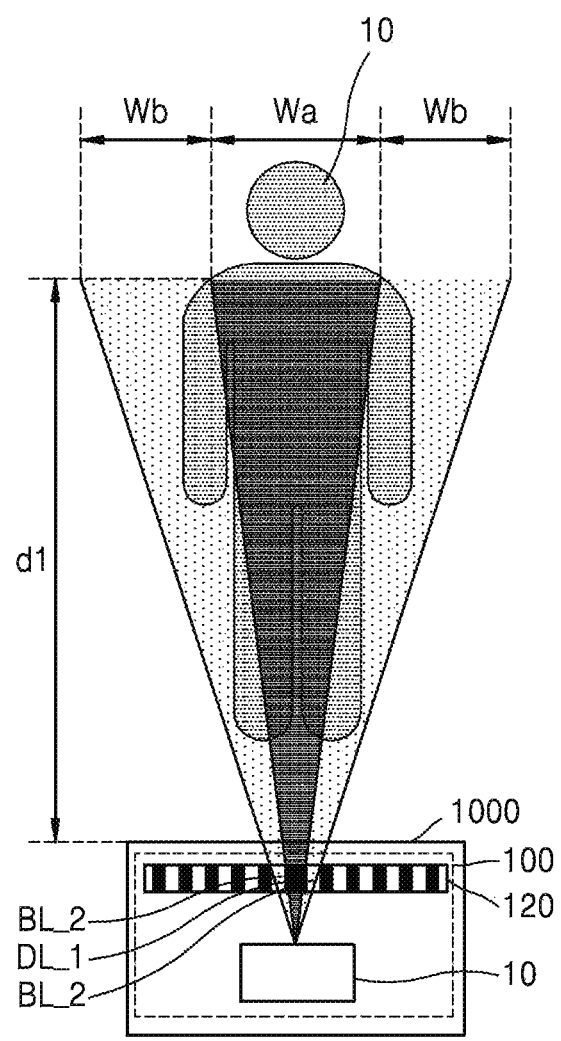
FIGS. 3A and 3B are schematic diagrams showing a relationship between the auxiliary light pattern and an object, according to an embodiment of the present disclosure.
Figure 3B:
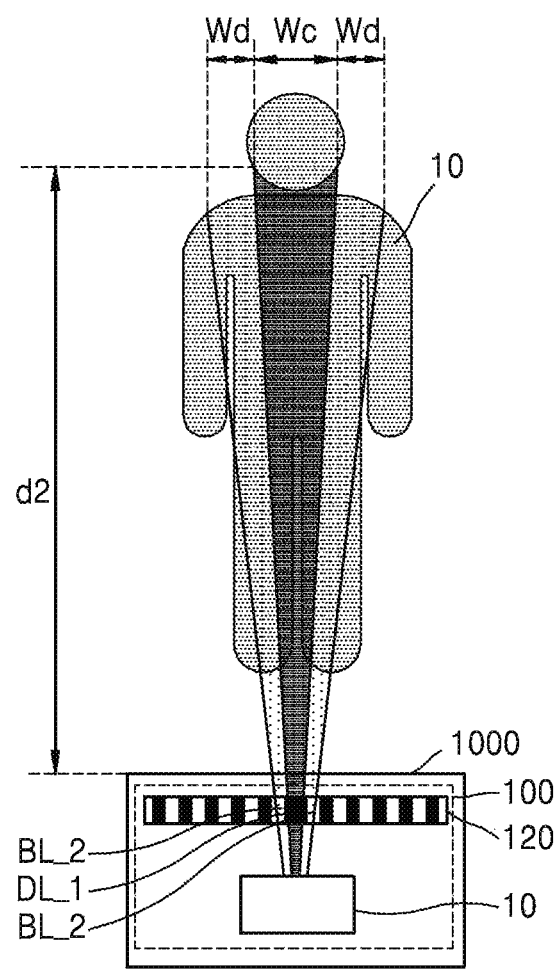

FIGS. 3A and 3B are schematic diagrams showing a relationship between the auxiliary light pattern 120 and the object 10, according to an embodiment of the present disclosure. FIGS. 3A and 3B show only patterns of the center portion of the auxiliary light pattern 120 via which light is projected by the auxiliary light projector 100, in order to describe the present embodiment of the present disclosure.

Referring to FIG. 3A, the photographing apparatus 1000 includes the auxiliary light projector 100 and the auxiliary light projector 100 may include the light emitter 110 and the auxiliary light pattern 120. A distance from the photographing apparatus 1000 to the object 10 may be a first object distance d1. The first object distance d1 may be determined based on a distance at which auxiliary light is irradiated with sufficient intensity or may be a maximum preferable object distance for portrait photographing. According to an embodiment, the first object distance d1 may be a pre-set distance. Light emitted from the light emitter 110 may be irradiated to the object 10 through the auxiliary light pattern 120. The irradiation pattern of the auxiliary light passed through the auxiliary light pattern 120 may be diffused as it moves away from the light emitter 110.

In the embodiment shown in FIG. 3A, widths Wa and Wb of the irradiation pattern of the auxiliary light at the first object distance d1 may be within the shoulder width of the object 10. Specifically, a light beam passed through the first dark pattern line DL_1 of the auxiliary light pattern 120 from among light beams generated by the light emitter 110 may be incident to the object 10 (e.g., a person), which is the first object distance d1 away, at the width Wa, whereas a light beam passed through the second bright pattern line BL_2 of the auxiliary light pattern 120 may be incident to the object 10, which is the first object distance d1 away, at the width Wb. In the above-stated embodiment, the irradiation pattern of the light passed through the first dark pattern line DL_1 of the auxiliary light pattern 120 may be irradiated onto the object 10 at the width Wa (that is, a width smaller than the shoulder width of the object 10), whereas the irradiation pattern of the light passed through the second bright pattern line BL_2 of the auxiliary light pattern 120 may be irradiated onto shoulders and arms of the object 10 at the width Wb. Therefore, in a case of photographing the object 10 located within the first object distance d1, the boundary between the first dark pattern line DL_1 and the second bright pattern line BL_2 is irradiated onto the object 10, and thus, focus adjustment regarding the object 10 may be easily facilitated in the case of adjusting a focus based on the phase difference method.

According to an embodiment, the width Wa of the irradiation pattern of the light passed through the first dark pattern line DL_1 may be equal to the width Wb of the irradiation pattern of the light passed through the second bright pattern line BL_2.

Referring to FIG. 3B, a distance from the photographing apparatus 1000 to the object 10 may be a second object distance d2. The second object distance d2 may be determined based on a distance at which auxiliary light is irradiated with sufficient intensity or may be a maximum preferable object distance for portrait photographing.

In the embodiment shown in FIG. 3B, the widths Wc and Wd of the irradiation pattern of auxiliary light at the second object distance d2 may be widths within the width of the head of the object 10. In other words, a light beam passed through the first dark pattern line DL_1 of the auxiliary light pattern 120 from among light beams generated by the light emitter 110, which is the second object distance d2 away, at the width Wc, whereas light passed through the second bright pattern line BL_2 of the auxiliary light pattern 120 may be irradiated onto a portion of the object 10, which is the second object distance d2 away, between the head and the shoulders of the object 10 at the width Wd. Therefore, in case of photographing the object 10 located within the second object distance d2, the boundary between the first arm part pattern line DL_1 and the second part pattern line BL_2 is irradiated onto the head portion of the object 10, and thus focus adjustment with respect to the object 10 may be easily facilitated in case of adjusting a focus based on the phase difference method.

FIGS. 3A and 3B are diagrams for describing a case where light generated by the light emitter 110 passes through a dark pattern line DL_1 and a bright pattern line BL_2 arranged at the center portion of the auxiliary light pattern 120, and the boundaries between the bright pattern line BL_2 and the dark pattern line DL_1 is irradiated onto a shoulder portion or a head portion of a person. In case of photographing a person (that is, the object 10) by using the photographing apparatus 1000, a photographer configures a photographing device so that the person is located at the center of an imaging region. Therefore, when the auxiliary light pattern 120 is implemented according to the embodiment shown in FIGS. 3A and 3B, the boundary between the dark pattern line and the bright pattern line BL may be irradiated onto the head portion or the shoulder portion of the object 10, and thus phase difference auto-focus adjustment regarding the object 10 may be easily facilitated in case of photographing the bust of the person or the face of the person only.

FIGS. 4 through 8 are diagrams showing auxiliary light patterns 120a through 120e according to embodiments of the present disclosure. The auxiliary light patterns 120a through 120e according to embodiments shown in FIGS. 4 through 8 are identical to the auxiliary light pattern 120 shown in FIG. 2 except for directions in which the plurality of bright pattern lines BL and the plurality of dark pattern lines DL are arranged, formations thereof, and widths thereof. Therefore, the below descriptions of the auxiliary light patterns 120a through 120e shown in FIGS. 4 through 8 will focus on differences between the auxiliary light patterns 120a through 120e and the auxiliary light patterns 120 shown in FIG. 2, and redundant descriptions will be omitted.

Figure 4:
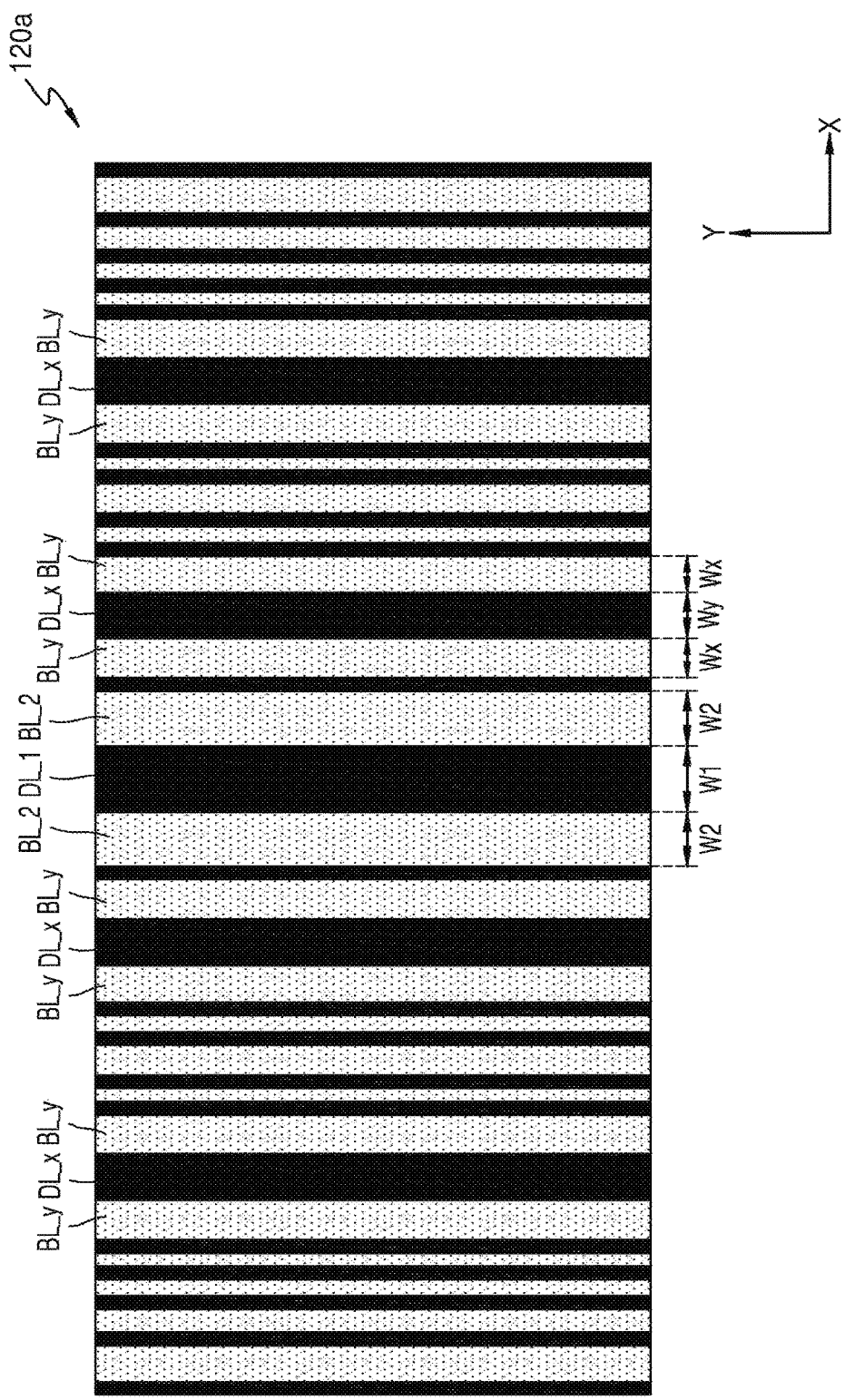
FIGS. 4 through 8 are diagrams showing auxiliary light patterns according to embodiments of the present disclosure.

Referring to FIG. 4, the first dark pattern line DL_1 and the second bright pattern line BL_2 are arranged at the center portion of the auxiliary light pattern 120a, and an outer dark pattern line DL_x and an outer bright pattern line BL_y may be arranged at both sides of the center portion, that is, the peripheral portion. The first dark pattern line DL_1 may have the first width W1 and the second bright pattern line BL_2 may have the second width W2. The outer dark pattern line DL_x may have a width Wx and the outer bright pattern line BL_y may have a width Wy. The first width W1 may be greater than the width Wx of the outer dark pattern line DL_x and the second width W2 may be greater than the width W2 of the outer bright pattern line BL_y. The first width W1 may be greater than the second width W2 and the size Wx of the outer dark pattern line DL_x may be greater than the width Wy of the outer lead pattern line BL_y. However, the present disclosure is not limited thereto. The width Wx of the outer dark pattern line DL_x may be identical to the first width W1 and the width Wy of the outer bright pattern line BL_y may be identical to the second width W2.

The numbers and locations of the outer dark pattern line DL_x and the outer bright pattern line BL_y are not limited to the example shown in FIG. 4. According to an embodiment, the auxiliary light pattern 120a may include only the first dark pattern line DL_1 having a width greater than the width Wx of the outer dark pattern line DL_x and may not include the second bright pattern line BL_2 having a width greater than the width Wy of the outer bright pattern line BL_y. Likewise, according to an embodiment, the auxiliary light pattern 120a may include only the second bright pattern line BL_2 having a width greater than the width Wy of the outer bright pattern line BL_y and may not include the first dark pattern line DL_1 having a width greater than the width Wx of the width DL_x.

In the embodiment shown in FIG. 4, similar to the embodiment shown in FIG. 3A and FIG. 3B, it may be configured such that the boundary between irradiation patterns of auxiliary light passing through the center portion of the auxiliary light pattern 120a within a pre-set object distance is within a width corresponding to a shoulder width or a face width of a person.

In the auxiliary light pattern 120a shown in FIG. 4, dark pattern lines and bright pattern lines having certain widths are distributed in portions other than the center portion of the auxiliary light pattern 120a. Therefore, when an object to be focused by the photographer is located at a location apart from the center portion of an imaging region, e.g., outside the imaging region, instead of the center portion of the imaging region, when the subject is moved from the center portion, or when light reflectivity of an object at the center portion of the imaging region is insufficient, focus adjustment may be easily facilitated through the auxiliary light pattern 120a according to the present embodiment.

Figure 5:
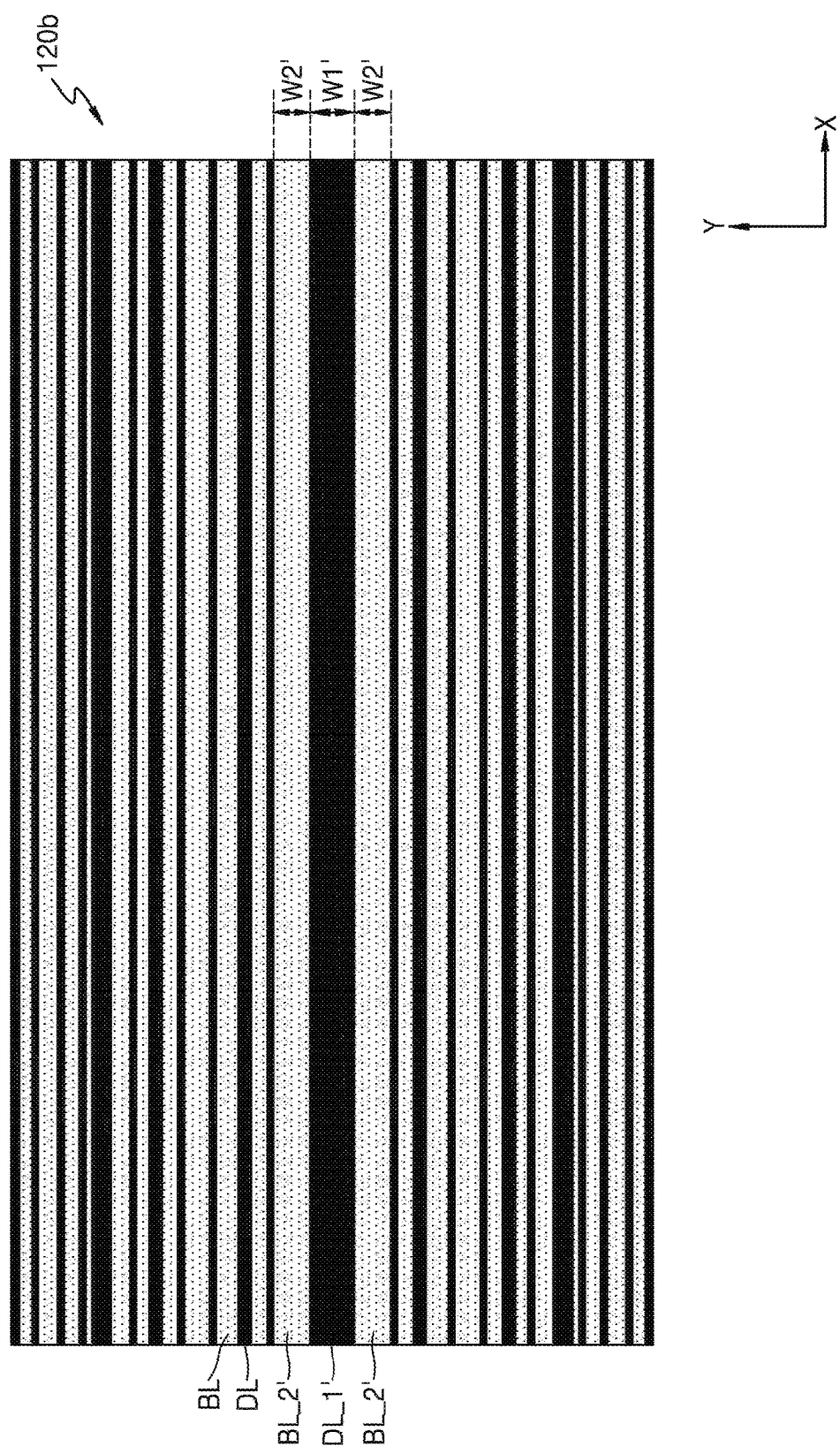

Referring to FIG. 5, the auxiliary light pattern 120b includes a plurality of dark pattern lines DL and a plurality of bright pattern lines BL extending in the first direction (X direction) and alternately arranged in the second direction (Y direction) in an imaging region. The first direction (X direction) may be a horizontal direction of the imaging region, whereas the second direction (Y direction) may be a vertical direction of the imaging region. The auxiliary light pattern 120b according to the embodiment shown in FIG. 5 is identical the auxiliary light pattern 120 except that the auxiliary light pattern 120b corresponds to a ±90° rotation of the auxiliary light pattern 120 shown in FIG. 2.

According to an embodiment, a first dark pattern line DL_1' may be disposed at the center of the auxiliary light pattern 120b and second bright pattern lines BL_2' may be disposed at both sides of the first dark pattern line DL_1'. The first dark pattern line DL_1' may be formed to have a first width W1' in the second direction (Y direction) and the second bright pattern line BL_2' may be formed to have a second width W2' in the second direction (Y direction). A plurality of dark pattern lines DL and a plurality of bright pattern lines BL having different widths may be alternately arranged in the peripheral portion other than the center portion of the auxiliary light pattern 120b. According to an embodiment, the first width W1' may be greater than each of the widths of the plurality of dark pattern lines DL except for the width of the first dark pattern line DL_1'. According to an embodiment, the second width W2' may be greater than each of the widths of the plurality of bright pattern lines BL except for the second bright pattern line BL_2'.

In case of the auxiliary light pattern 120b according to the embodiment shown in FIG. 5, a contrast pattern having a certain width may be irradiated onto an object when the object is located at a horizontal end portion of an imaging region. Therefore, in case of performing a phase difference auto-focus adjustment by detecting brightness of the horizontal end portion of the imaging region, a focus on the object may be easily adjusted.

Figure 6:
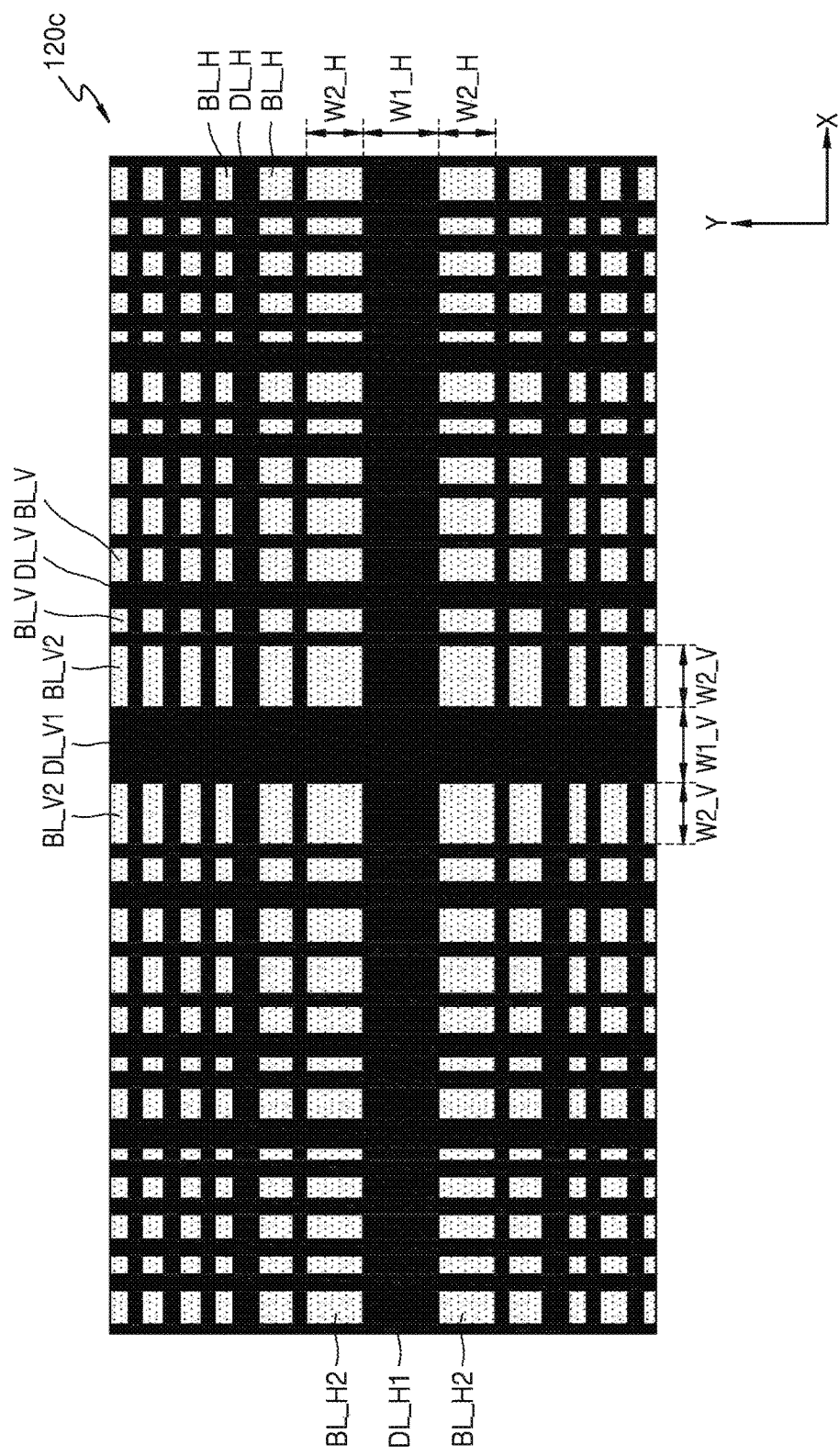

Referring to FIG. 6, the auxiliary light pattern 120c may be a pattern formed by synthesizing the auxiliary light pattern 120 shown in FIG. 2 with the auxiliary light pattern 120b shown in FIG. 5. Specifically, the auxiliary light pattern 120c may include vertical pattern lines including a plurality of vertical light pattern lines BL_V and a plurality of vertical dark pattern lines DL_V extending in the second direction (Y direction) in an imaging region and being alternately and repeatedly arranged in the first direction (X direction) and horizontal pattern lines including a plurality of horizontal bright pattern lines BL_H and a plurality of horizontal dark pattern lines DL_H extending in the first direction (X direction) in the imaging region and being arranged alternately and repeatedly in the second direction (Y direction). Here, the first direction (X direction) may be a horizontal direction of the imaging region, and the second direction (Y direction) may be a vertical direction of the imaging region.

The vertical pattern line and the horizontal pattern line may intersect vertically with each other. According to an embodiment, in a portion where the bright pattern line and the dark pattern line overlap each other due to an intersection of the vertical pattern line and the horizontal pattern line, the dark pattern line may be preferentially formed compared to the bright pattern line. In other words, in the overlapping portion, the dark pattern line may turn the bright pattern line into an opaque pattern.

According to an embodiment, the first vertical dark pattern line DL_V1 having the largest width from among the plurality of vertical dark pattern lines DL_V may be disposed at the center of the auxiliary light pattern 120c, and the second vertical row pattern line BL_V2 having the largest width from among the plurality of vertical bright pattern lines BL_V may be disposed in contact with both sides of the first vertical dark pattern line DL_V1. Furthermore, a first horizontal dark pattern line DL_H1 having the largest width from among the plurality of horizontal dark pattern lines DL_H may be disposed at the center of the auxiliary light pattern 120c, and a second bright pattern line BL_H2 having the largest width from among the plurality of horizontal bright pattern lines BL_H may be disposed in contact with both sides of the first horizontal dark pattern line DL_H1. A plurality of vertical dark pattern lines DL_V and a plurality of vertical bright pattern lines BL_V having different widths may be alternately and repeatedly arranged at sides of the second vertical bright pattern line BL_V2. Likewise, a plurality of horizontal dark pattern lines DL_H and a plurality of horizontal bright pattern lines BL_H having different widths may be alternately and repeatedly arranged on a top surface and a bottom surface of the second horizontal bright pattern line BL_H2.

The first vertical dark pattern line DL_V1 is formed in the first direction (X direction) to have a first vertical width W1_V and the second vertical bright pattern line BL_V2 is formed in the first direction (X direction) to have a second vertical width W2_V. According to an embodiment, the first vertical width W1_V may be greater than the second vertical width W2_V, but is not limited thereto. The second horizontal dark pattern line DL_H1 may be formed in the second direction (Y direction) to have a first horizontal width W1_H and the second horizontal bright pattern line BL_H2 may be formed in the second direction (Y direction) to have a second horizontal width W2_H. According to an embodiment, the first horizontal width W1_H may be greater than the second horizontal width W2_H, but is not limited thereto.

According to an embodiment, width of a vertical contrast pattern passing through the center portion of the auxiliary light pattern 120c within a predetermined object distance may be within a width corresponding to a shoulder width or a face width of a person, who is an object.

Figure 7:
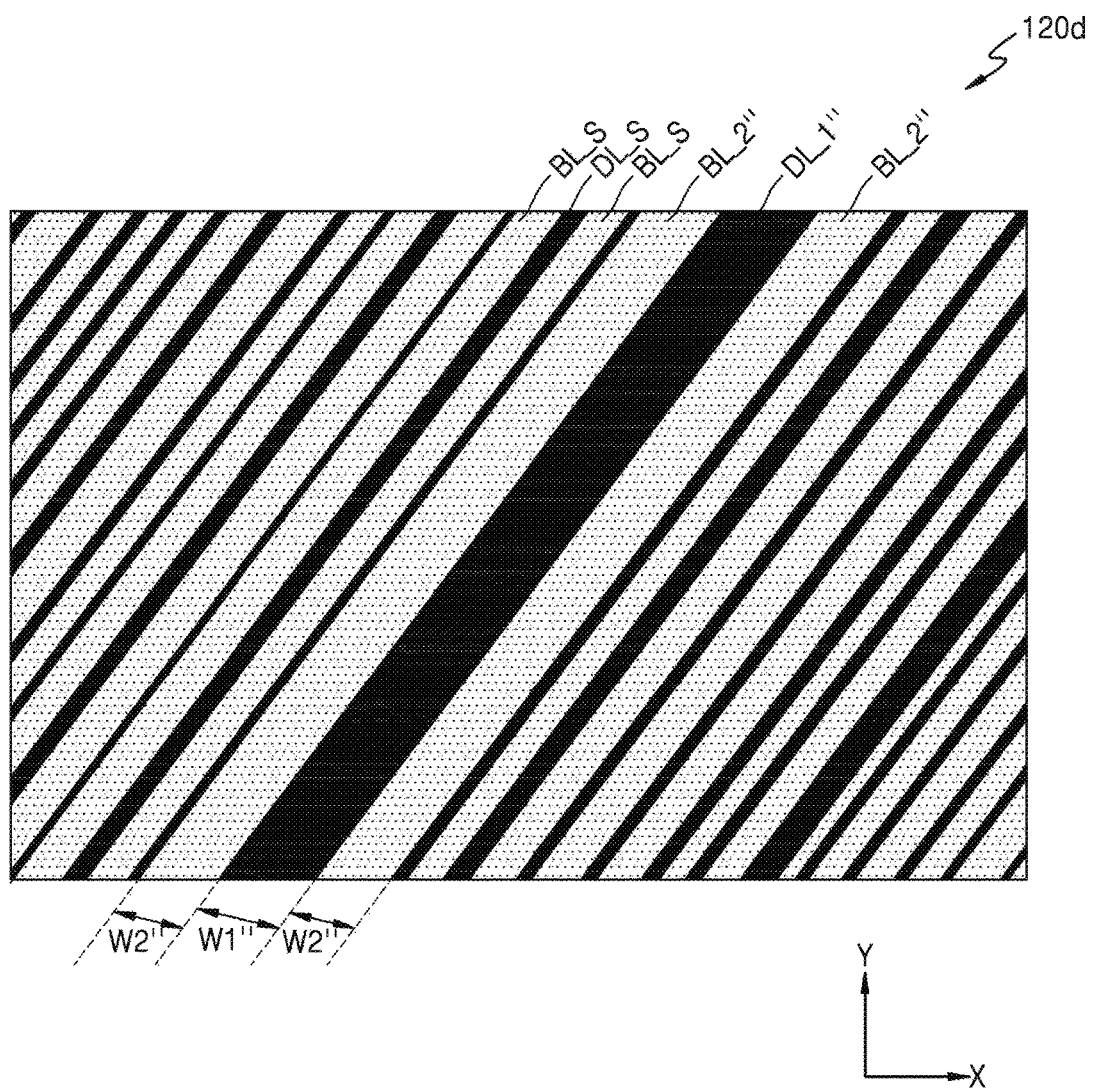

Referring to FIG. 7, the auxiliary light pattern 120d may include a plurality of bright pattern lines BL_S and a plurality of dark pattern lines DL_S extending diagonally in an imaging region. Specifically, the plurality of bright pattern lines BL_S and the plurality of dark pattern lines DL_S may be extended in a diagonal direction at a predetermined angle between the first direction (X direction) and the second direction (Y direction) and may be alternately arranged in a direction intersecting with the diagonal direction. According to an embodiment, the plurality of bright pattern lines BL_S and the plurality of dark pattern lines DL_S may be extended in a direction forming an angle from 10° to 80° with respect to the first direction (X direction).

According to another embodiment, the plurality of bright pattern lines BL_S and the plurality of dark pattern lines DL_S may be extended in a diagonal direction at an angle different from that shown in FIG. 7. According to an embodiment, the plurality of bright pattern lines BL_S and the plurality of dark pattern lines DL_S may be extended in a direction forming an angle from 100° to 170° with respect to the first direction (X direction).

The auxiliary light pattern 120d includes a first dark pattern line DL_1" extending in a diagonal direction across the center portion of the auxiliary light pattern 120d, and a first dark pattern line BL_2" extending in a diagonal direction at the same angle as the first dark pattern line DL_1" at both sides of a first dark pattern line DL". The first dark pattern line DL_1" is formed to have a first width W1" and the second bright pattern line BL_2"" is formed to have a second width W2". A plurality of dark pattern lines DL_S and a plurality of bright pattern lines BL_S having different widths may be extended in a diagonal direction in portions other than the center portion of the auxiliary light pattern 120d, that is, the peripheral portion. The width W1 "of the first dark pattern line DL_1" may be greater than the width of each of the plurality of dark pattern lines DL_S except for the first dark pattern line DL_1". Similarly, the width W2"

of the second bright pattern line BL_2 may be greater than the width of each of the plurality of bright pattern lines BL_S except for the second bright pattern line BL_2". The width W1" of the first dark pattern line DL_1" may be greater than the width W2" of the second bright pattern line BL_2", but is not limited thereto.

The auxiliary light pattern 120d according to the embodiment shown in FIG. 7 may project a contrast pattern having a certain width onto an object even when even when location of the object is deviated from the center portion of an imaging region, unlike the auxiliary light pattern 120 shown in FIG. 2. Therefore, in case of photographing an object which is deviated from the center area of an imaging region, focus may be easily adjusted based on the phase difference method.

Figure 8:
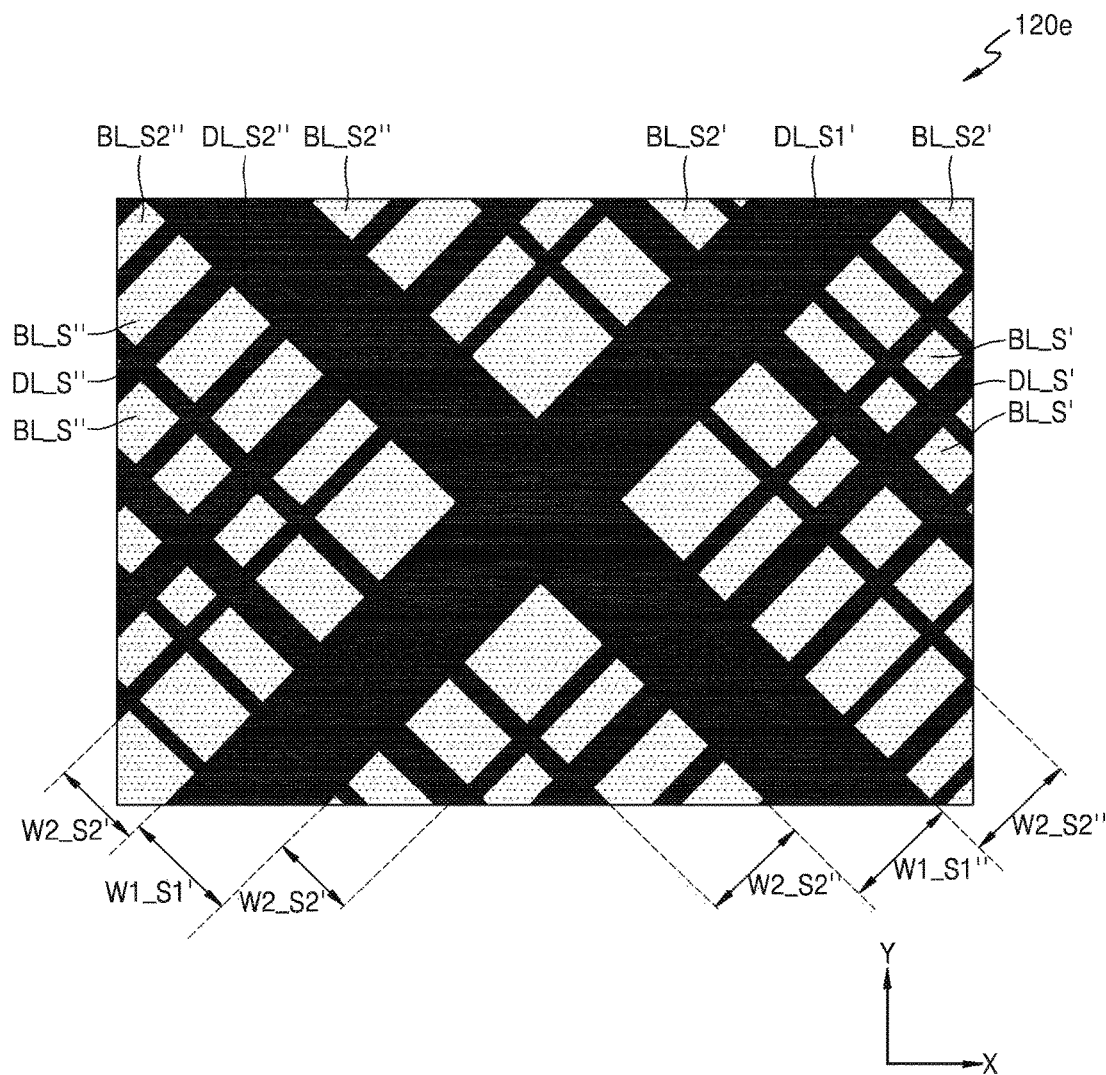

Referring to FIG. 8, the auxiliary light pattern 120e may be a pattern formed by intersecting and synthesizing the auxiliary light pattern 120d shown in FIG. 7 with horizontally symmetric patterns of the auxiliary light pattern 120d. Specifically, the auxiliary light pattern 120e may include a plurality of first bright pattern lines BL_S' and a plurality of dark pattern lines DL_S' being extended in a first diagonal direction between the first direction (X direction) and the second direction (Y direction) in an imaging region and are alternately arranged in a second diagonal direction intersecting with the first diagonal direction. Furthermore, the auxiliary light pattern 120e may include a plurality of second bright pattern lines BL_S" and a plurality of second dark pattern lines DL_S" being extended in the second diagonal direction in the imaging region and are alternately arranged in the first diagonal direction. According to an embodiment, the first diagonal direction may be a direction forming an angle from 10° to 80° with respect to the first direction (X direction), whereas the second diagonal direction may be a direction forming an angle from 100° to 170° with respect to the first direction (X direction).

The plurality of first bright pattern lines BL_S' and the plurality of second bright pattern lines BL_S" may be arranged to intersect with each other. Similarly, the plurality of first dark pattern lines DL_S' and the plurality of second dark pattern lines DL_S" may be arranged to intersect with each other. According to an embodiment, there may be overlapping portions between the plurality of first diagonal pattern lines BL_S' and the plurality of first dark pattern lines DL_S' extending in the first diagonal direction and the plurality of first dark pattern lines DL_S' and the plurality of second diagonal pattern lines DL_S" extending in the second diagonal direction. At the overlapping portions, dark pattern lines may be formed at a higher priority than bright pattern lines. In other words, at the overlapping portions, dark pattern lines may turn bright pattern lines into an opaque pattern.

A first dark pattern line DL_S1' having the largest width from among the plurality of first dark pattern lines DL_S' may be disposed at the center of the auxiliary light pattern 120e. Furthermore, a second bright pattern line BL_S2' having the largest width from among a plurality of first bright pattern lines BL_S' may be arranged at both sides of the first dark pattern line DL_S'. The first dark pattern line DL_S1' may be formed to have a width W1_S1' and the second bright pattern line BL_S2' may be formed to have a width W2_S2'. A plurality of first dark pattern lines DL_S' and a plurality of first bright pattern lines BL_S' having different widths may be alternately and repeatedly arranged at sides of the second bright pattern line BL_S'. Furthermore, a first dark pattern line DL_S1" having the largest width from among the plurality of second dark pattern lines DL_S" may be disposed at the center of the auxiliary light pattern 120e. A second bright pattern lines BL_S2') having the largest width from among the plurality of second bright pattern lines BL_S" may be arranged at both sides of the first dark pattern line" DL_S1". The first dark pattern line DL_S1" may be formed to have a width W1_S1" and the second bright pattern line BL_S2" may be formed to have a width W2_S2". The plurality of second dark pattern lines DL_S" and the plurality of second bright pattern lines BL_S" having different widths may be alternately and repeatedly arranged at sides of the second bright pattern line BL_S".

The auxiliary light pattern 120e shown in FIG. 8 projects a contrast pattern having a certain width onto an object when the object is located either at the center portion of an imaging region in the first diagonal direction or at the center portion of the imaging region in the second diagonal direction. Therefore, compared to a case of projecting auxiliary light passed through the auxiliary light pattern 120d shown in FIG. 7, phase difference auto-focus adjustment may be performed more easily with respect to objects at a wider range of locations.

Figure 9:
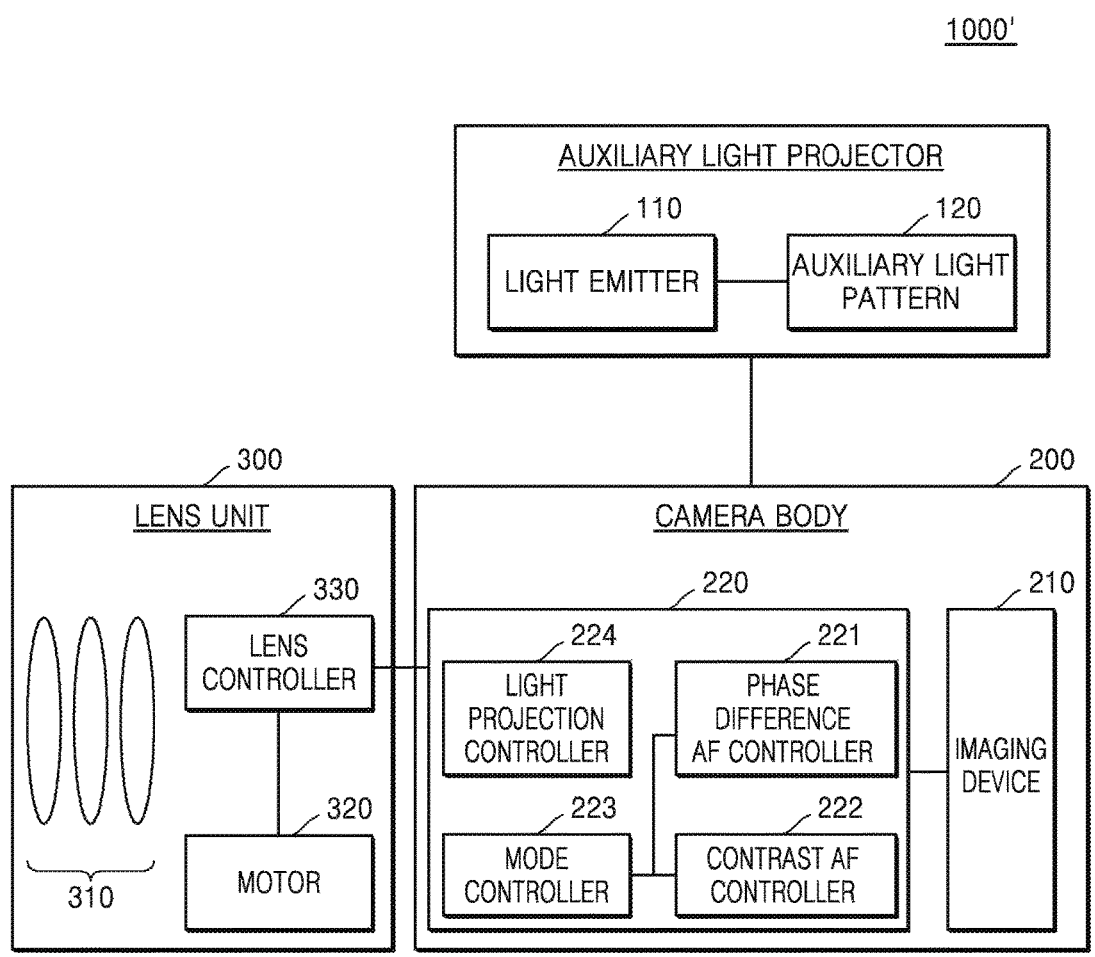
FIG. 9 is a block diagram showing components of a photographing apparatus including the auxiliary light projector according to an embodiment of the present disclosure.

FIG. 9 is a block diagram showing the components of a photographing apparatus 1000 including the auxiliary light projector 120 according to an embodiment of the present disclosure.

Referring to FIG. 9, the photographing apparatus 1000 may include an auxiliary light projector 100, a camera body 200, and a lens unit 300. The photographing apparatus 1000 may be, for example, a digital single lens reflex (DSLR) camera, a lens-interchangeable camera, or a mirrorless camera. The lens unit 300 may be mounted on the camera body 200.

The auxiliary light projector 100 may include a light emitter 110 and an auxiliary light pattern 120. According to an embodiment, the auxiliary light projector 100 may be mounted on or embedded in the upper portion of the camera body 200.

The light emitter 110 may emit auxiliary light for assisting with auto-focusing in the photographing apparatus 1000 to an object. The light emitter 110 may include, for example, a light emitting diode (LED). The light emitter 110 may emit light according to an electrical signal received from a controller 220 of the photographing apparatus 1000.

The auxiliary light projector 100 may include the auxiliary light pattern 120 for projecting auxiliary light of a predetermined pattern for assisting with the auto-focusing of the photographing apparatus 1000. Although FIG. 9 shows that the auxiliary light pattern 120 is shown as the auxiliary light pattern 120 as shown in FIG. 2, the present disclosure is not limited thereto. In other words, the auxiliary light projector 100 shown in FIG. 9 may include any one of the auxiliary light patterns 120 and 120a through 120e shown in FIGS. 2 and 4 through 8.

The camera body 200 may include an imaging device 210 and the controller 220.

The imaging device 210 may be a CMOS (Complementary Metal-Oxide Semiconductor) image sensor having a plurality of photoelectric conversion elements corresponding to pixels or a CCD (Charge-Coupled Device) image sensor device. The imaging device 210 may include imaging pixels and focus detection pixels. The focus detection pixels may be arranged in a line, for example, and may output a signal for performing focus adjustment based on the phase difference method. In other words, a phase difference AF controller 221, which will be described later, may perform a focus adjustment process by performing a calculation using an output signal from the focus detection pixels. According to an embodiment, the photographing apparatus 1000 may automatically adjust a focus based on a top surface phase difference method.

The controller 220 may include the phase difference AF controller 221, a contrast AF controller 222, a mode controller 223, and a light projection controller 224. The controller 220 may control the photographing apparatus 1000. Specifically, the controller 220 has functions as a computer having a CPU and a memory, for example, and may control the photographing apparatus 1000 by executing a program stored in the memory. Some or all of processes of the controller 220 may be implemented by hardware, such as an electric circuit.

The phase-difference AF controller 221 may perform focus adjustment based on a known phase difference auto-focus adjustment. In other words, the phase difference AF controller 221 calculates a defocusing amount by detecting a distance between a pair of object images transmits an electric signal to a lens controller 330 in order to move position of a focus lens 310 in the lens unit 300 according to the calculated defocusing amount. Furthermore, the phase-difference AF controller 221 may transmit to the mode controller 223 an evaluation index that is a reliability index of a focus adjustment based on the phase difference method, that is, a reliability index of a calculated defocusing amount. Here, the evaluation index may be a value that is a reliability index of defocusing amount.

In the phase difference method, light flux from an object is separated in two directions and irradiated to a focus detection pixel group arranged along a line. At this time, two output distributions representing light intensities may be obtained according to values of outputs from the focus detection pixel group. Calculation of a defocusing amount may be performed by detecting a relative deviation of two waveforms represented by the two output distributions. Correlation of the two waveforms at the shifted location is calculated while shifting relative locations of both of the waveforms to detect an amount of deviation. The calculation of the correlation is performed because a shifting amount corresponding to the highest correlation corresponds to an amount of deviation. According to an embodiment, the phase difference AF controller 221 may use the correlation as an evaluation value. The higher the correlation is, the higher the reliability may be. However, the present disclosure is not limited thereto. For example, peak values of both of waveforms may be used as evaluation values. The greater the peak values are, the higher the reliability may be.

The contrast AF controller 222 may perform focus adjustment based on a known contrast auto-focus adjustment, which is an auto-focus method for detecting adjusting focus by detecting a contrast on an object. The contrast AF controller 222 obtains a contrast value from the imaging device 210 while moving the focus lens 310, detects a location of the focus lens 310 corresponding to the highest contrast value, and determine the location of the focus lens 310 corresponding to the highest contrast value as a focused location. Specifically, the contrast AF controller 222 calculates a contrast value of each of a plurality of partial areas obtained by dividing the entire imaging device 210, for example, and accumulates contrast values of the partial areas, thereby calculating a contrast evaluation value at a location of the focus lens 310 corresponding to the time. Furthermore, the contrast AF controller 222 may obtain contrast values according to outputs of pixels at every predetermined interval from among all of the pixels in the imaging region. In this regard, a processing load may be reduced as compared to a case where contrast values are obtained according to outputs of all of the pixels in the imaging region. Furthermore, the contrast AF controller 222 may obtain contrast values according to outputs of all of the pixels in the imaging region. The contrast AF controller 222 may determine a location of the focus lens 310 corresponding to the maximum contrast evaluation value as a focus location.

The mode controller 223 may control switching between a focus adjustment by the phase difference AF controller 221 and a focus adjustment by the contrast AF controller 222. The mode controller 223 may switch a focus adjusting mode to focus adjustment by the contrast AF controller 222 when an evaluation value used as a reliability index of a focus adjustment by the phase difference AF controller 221 does not satisfy a predetermined reference value. However, the present disclosure is not limited thereto. According to another embodiment, regardless of a value of the above evaluation value, after the mode controller 223 performs a focus adjustment by the phase difference AF controller 221, the mode controller 223 may perform a focus adjustment by the contrast AF controller 222.

The phase difference AF controller 221 performs a focus adjustment based on a brightness difference of a contrast pattern of a pre-set area including the center portion of auxiliary light emitted by the auxiliary light projector 100, whereas the contrast AF controller 222 may perform a focus adjustment based on a brightness difference of a contrast pattern of a portion outside of the center portion, that is, the peripheral portion. Based on an embodiment, the phase-difference AF controller 221 may perform a focus adjustment not only based on a brightness difference of a contrast pattern of a pre-set area including the center portion of auxiliary light emitted by the auxiliary light projector 100, but also based on a brightness difference of another portion. Based on an embodiment, a focus adjustment by the contrast AF controller 222 may be performed not only based on a brightness difference of a contrast pattern of the peripheral portion, but also based on a brightness of a contrast patterns of the center portion.

The light projection controller 224 may control light projection by the auxiliary light projector 100. Specifically, the light projection controller 224 may transmit a signal for instructing light emission to the light emitter 110. The light projection controller 224 may control the light emitter 110 to emit light during a focus adjustment by the phase difference AF controller 221 and a focus adjustment by the contrast AF controller 222.

According to an embodiment, the light projection controller 224 may transmit a signal for instructing the light emitter 110 to emit light when it is determined that brightness of an object is low or when it is determined that the contrast of an object is low and focusing is impossible. For example, the light projection controller 224 may determine that brightness of an object detected by the imaging device 210 is less than a minimum physical quantity causing a predetermined reaction and transmit signal for instructing the light emitter 110 to emit light. For example, when a contrast value of an object is less than a minimum physical quantity causing a predetermined reaction, the light projection controller 224 may determine that contrast is low and may transmit a signal instructing the light emitter 110 to emit light.

The controller 220 may receive lens information from the lens controller 330 of the lens unit 300 and transmit information regarding an amount of movement of the focus lens 310 to the lens controller 330. The controller 220 may generate image information by performing a predetermined information processing operation regarding pixel outputs from the imaging device 210 as needed and output the generated image information to a recording medium (not shown).

The lens unit 300 may include the focus lens 310, a motor 320, and the lens controller 330. According to an embodiment, the focus lens 310 may include a plurality of lenses, and the motor 320 may change location of the focus lens 310. The lens controller 330 may control components of the lenses.

The photographing apparatus 1000 shown in FIG. 9 may have both a phase difference auto-focusing function and a contrast auto-focusing function. Since the photographing apparatus 1000 may control a focus based on a hybrid method for complementing the phase difference auto-focusing function and the contrast auto-focusing function by projecting auxiliary light via the auxiliary light projector 100 including the auxiliary light pattern 120, thereby reducing a time elapsed for auto-focusing and improving reliability of auto-focusing function.

Figure 10:
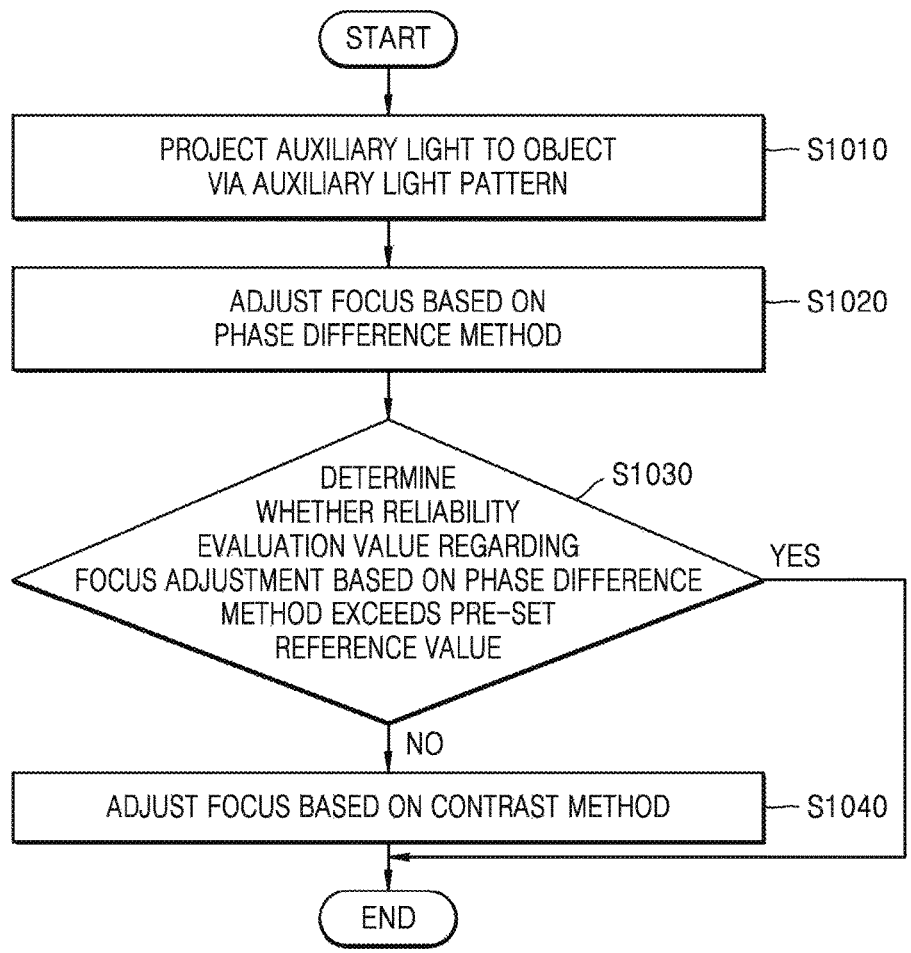
FIG. 10 is a flowchart showing an auto-focusing method performed by the photographing apparatus shown in FIG. 9.

FIG. 10 is a flowchart showing an auto-focusing method performed by the photographing apparatus 1000 shown in FIG. 9. Hereinafter, respective components and the reference numerals of the respective components will be referred to those shown in FIG. 9.

In operation S1010, the photographing apparatus 1000 projects auxiliary light to an object via the auxiliary light pattern 120. Specifically, when a light emission instruction is received by the light emitter 110 from the light projection controller 224, the light emitter 110 emits light, and the emitted light may be irradiated to an object through the auxiliary light pattern 120. Referring to FIGS. 2 and 4 through 8, a dark pattern line may block the light emitted by the light emitter 110, whereas a bright pattern line may transmit the light therethrough.

In operation S1020, the photographing apparatus 1000 adjusts a focus based on a phase difference auto-focus adjustment. According to an embodiment, the phase difference AF controller 221 may detect a brightness difference of a contrast pattern of the center portion of the auxiliary light projected by the auxiliary light projector 100 and adjust a focus based on the same. Referring to FIGS. 2 and 4 through 8, the phase-difference AF controller 221 may detect a brightness difference due to auxiliary light passed through the plurality of bright pattern lines BL and the plurality of dark pattern lines DL and adjust a focus. The phase difference AF controller 221 may obtain an evaluation value that is a reliability index for a focus adjustment based on the phase difference method. The phase difference AF controller 221 may transmit the evaluation value to the mode controller 223.

In operation S1030, the photographing apparatus 1000 determines whether a reliability evaluation value of a focus adjustment by the phase difference method exceeds a pre-set reference value. According to an embodiment, the mode controller 223 may determine whether the evaluation value received from the phase difference AF controller 221 in operation S1020 exceeds the pre-set reference value. When the evaluation value exceeds the pre-set reference value (YES), it is determined that an object is sufficiently focused and the focus adjustment is terminated. When the evaluation value is less than or equal to the pre-set reference value (NO), the mode controller 223 may determine that the object is not sufficiently focused and may switch focus adjusting mode to a focus adjustment by the focus AF controller 222. When the focus adjusting mode is switched, location of the focus lens 310 may be moved to a location to which the focus lens 310 is moved due to the focus adjustment by the phase difference AF controller 221. According to an embodiment, location of the focus lens 310 may be adjusted by the motor 320.

In operation S1040, the photographing apparatus 1000 adjusts a focus based on a contrast method. According to an embodiment, the contrast AF controller 222 may adjust a focus based on a contrast method. According to an embodiment, the contrast AF controller 222 may detect a brightness difference of a contrast pattern in the peripheral portion of the irradiation pattern of auxiliary light to perform a focus adjustment. Referring to FIGS. 2 and 4 through 8, the contrast AF controller 222 may adjust a focus by detecting a brightness difference of the contrast pattern of the peripheral portion to which auxiliary light is irradiated by the plurality of bright pattern lines BL and the plurality of dark pattern lines DL.

Referring to FIGS. 9 and 10, the photographing apparatus 1000 may first adjust a focus based on a generally fast phase difference auto-focus adjustment and may adjust the focus based on a contrast auto-focus adjustment. In the above embodiment, since a focus is already adjusted based on the phase difference method before the focus adjustment based on the contrast method, a time elapsed for focus adjustment may be reduced. Furthermore, in the above embodiment, when reliability of a result of the focus adjustment based on the phase difference method satisfies a pre-set reference value, the photographing apparatus 1000 does not perform the focus adjustment based on the contrast method, thereby reducing a time elapsed for focus adjustment.

An embodiment of the present disclosure may also be embodied in the form of a recording medium including instructions executable by a computer, such as program modules executed by a computer. A computer readable recording medium may be any available medium that may be accessed by a computer and includes volatile and non-volatile media and removable and non-removable media. The computer-readable recording medium may also include both a computer storage medium and a communication medium. A computer storage media includes volatile and nonvolatile media and removable and non-removable media implemented in any method or technology for storage of information such as computer readable instructions, data structures, program modules, or other data. A communication medium typically includes computer readable instructions, data structures, program modules, other data in a modulated data signal such as a carrier wave, or other transport mechanism and includes any information delivery media.

The foregoing description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, the foregoing embodiments should be regarded as illustrative rather than limiting in all aspects. In an example, each component which has been described as a unitary part can be implemented as distributed parts. Similarly, each component which has been described as distributed parts can also be implemented as a combined part.

The scope of the present disclosure is defined by the appended claims rather than the foregoing detailed description, and all changes or modifications that come within the meaning and range of equivalency of the claims and the equivalents thereof are included in the scope of the present disclosure.

The invention claimed is:

1. A photographing apparatus having an auto-focusing function, the photographing apparatus comprising:
a light emitter, which is mounted on the photographing apparatus and configured to project auxiliary light for assisting with auto-focusing of the photographing apparatus to an object; and
an auxiliary light pattern comprising a plurality of bright pattern lines for transmitting the auxiliary light therethrough to project the auxiliary light to the object and a plurality of dark pattern lines for blocking the auxiliary light to prevent the auxiliary light from reaching the object,
wherein the plurality of bright pattern lines and the plurality of dark pattern lines are arranged alternately and repeatedly, and
a dark pattern line having a largest width from among the plurality of dark pattern lines and a bright pattern line having a largest width from among the plurality of bright pattern lines are arranged at a center portion of the auxiliary light pattern, and
wherein the width of the dark pattern line having the largest width is greater than the width of the bright pattern line having the largest width.

2. The photographing apparatus of claim 1,
wherein the dark pattern line having the largest width is arranged at the center portion of the auxiliary light pattern, and
wherein the plurality of bright pattern lines having the largest widths are arranged at both sides of the dark pattern line having the largest width.

3. The photographing apparatus of claim 1,
wherein the bright pattern line having the largest width is arranged at the center portion of the auxiliary light pattern, and
wherein the plurality of dark pattern lines having the largest widths are arranged at both sides of the bright pattern line having the largest width.

4. The photographing apparatus of claim 1,
wherein the dark pattern line having the largest width is arranged at the center portion of the auxiliary light pattern, and
wherein the plurality of bright pattern lines and the plurality of dark pattern lines are arranged in a horizontally symmetric formation around the dark pattern line having the largest width.

5. The photographing apparatus of claim 1,
wherein the bright pattern line having the largest width is arranged at the center portion of the auxiliary light pattern, and
wherein the plurality of dark pattern lines and the plurality of bright pattern lines are arranged in a horizontally symmetric formation around the bright pattern line having the largest width.

6. The photographing apparatus of claim 1, wherein the plurality of bright pattern lines have widths different from one another, and
the plurality of dark pattern lines have widths different from one another.

7. The photographing apparatus of claim 1, wherein the width of the dark pattern line having the largest width is identical to the width of the bright pattern line having the largest width.

8. The photographing apparatus of claim 1,
wherein the dark pattern line having the largest width and the bright pattern line having the largest width comprise a plurality of dark pattern lines having the largest width and a plurality of bright pattern lines having the largest width, respectively, and
wherein the plurality of dark pattern lines having the largest width and the plurality of bright pattern lines having the largest width are arranged in portions of the auxiliary light pattern other than the center portion of the auxiliary light pattern.

9. The photographing apparatus of claim 1,
wherein the plurality of bright pattern lines and the plurality of dark pattern lines are extended in a first direction in an imaging region, and
wherein the plurality of bright pattern lines and the plurality of dark pattern lines are arranged alternately and repeatedly in the imaging region in a second direction perpendicular to the first direction.

10. The photographing apparatus of claim 1,
wherein the auxiliary light pattern comprises:
a first pattern in which the plurality of bright pattern lines and the plurality of dark pattern lines extending in a first direction in an imaging region are arranged alternately and repeatedly in the imaging region in a second direction perpendicular to the first direction; and
a second pattern in which the plurality of bright pattern lines and the plurality of dark pattern lines extending in the second direction in the imaging region are arranged alternately and repeatedly in the imaging region in the first direction, and
wherein the first pattern and the second pattern intersect with each other perpendicularly.

11. The photographing apparatus of claim 1, wherein the plurality of bright pattern lines and the plurality of dark pattern lines are extended in a diagonal direction in an imaging region and are arranged alternately and repeatedly to intersect with each other.

12. The photographing apparatus of claim 1,
wherein the auxiliary light pattern comprises:
a first pattern in which the plurality of bright pattern lines and the plurality of dark pattern lines extending in a first diagonal direction in a imaging region are arranged alternately and repeatedly in the imaging region in a second diagonal direction intersecting with the first diagonal direction; and
a second pattern in which the plurality of bright pattern lines and the plurality of dark pattern lines extending in the second diagonal direction in the imaging region are arranged alternately and repeatedly in the imaging region in the first diagonal direction, and
wherein the first pattern and the second pattern are arranged alternately and repeatedly.

13. The photographing apparatus of claim 1, wherein a width of an irradiation pattern of auxiliary light, irradiated to an irradiation location within a pre-set object distance through the dark pattern line having the largest width and the bright pattern line having the largest width, is smaller than widths of some regions of the object at the irradiation location.

14. A photographing apparatus having auto-focusing function, the photographing apparatus comprising:
an auto focus (AF) processor, configured to adjust a focus regarding an object to be photographed by the photographing apparatus; and an auxiliary light projector, configured to project auxiliary light for assisting with a focus adjustment performed by the AF processor, wherein the auxiliary light projector comprises an auxiliary light pattern including a plurality of bright pattern lines for transmitting the auxiliary light therethrough to project the auxiliary light to the object and a plurality of dark pattern lines for blocking the auxiliary light to prevent the auxiliary light from reaching the object, wherein the plurality of bright pattern lines and the plurality of dark pattern lines are arranged alternately and repeatedly, and wherein a dark pattern line having a largest width from among the plurality of dark pattern lines and a bright pattern line having a largest width from among the plurality of bright pattern lines are arranged at a center portion of the auxiliary light pattern.

15. The photographing apparatus of claim 14, wherein the AF processor comprises a phase difference AF processor for adjusting a focus based on a phase difference method and a contrast AF processor for adjusting a focus based on a contrast method, and wherein the phase difference AF processor further comprises a mode controller, which controls switching between a first focus adjusting mode for adjusting a focus by the phase difference AF processor and a second focus adjusting mode for adjusting a focus by the contrast AF processor.

16. The photographing apparatus of claim 15, wherein the phase difference AF processor adjusts a focus based on a brightness difference of a contrast pattern of the center portion of the auxiliary light pattern, and wherein the contrast AF processor adjusts a focus based on a brightness difference of a contrast pattern of a portion of the auxiliary light pattern other than the center portion of the auxiliary light pattern.

17. The photographing apparatus of claim 16, wherein the phase difference AF processor obtains an evaluation value, which is a reliability index for a focus adjustment based on the phase difference method, and transmits the evaluation value to the mode controller, and wherein when the evaluation value does not exceed a pre-set reference value, the mode controller switches to the second focus adjusting mode.

18. A method of performing auto-focus by using an auxiliary light projector mounted on a photographing apparatus, the method comprising:

projecting auxiliary light to an auxiliary light pattern included in the auxiliary light projector;

adjusting a focus in a first focus adjusting mode based on a brightness difference of a contrast pattern in a first region, which is a center region of the auxiliary light pattern;

determining whether a reliability evaluation value regarding a focus adjustment based on the first focus adjusting mode exceeds a pre-set reference value; and, when the reliability evaluation value does not exceed the pre-set reference value, adjusting a focus in a second focus adjusting mode based on a brightness difference of a contrast pattern in a second region of the auxiliary light pattern, wherein the auxiliary light pattern comprises a plurality of bright pattern lines, which have widths different from one another and the auxiliary light is transmitted therethrough to project the auxiliary light to an object, and a plurality of dark pattern lines, which have widths different from one another and block the auxiliary light to prevent the auxiliary light from reaching the object.

19. The method of claim 18, wherein the first focus adjusting mode is a focus adjusting mode for adjusting a focus based on a phase difference method, and wherein the second focus adjusting mode is a focus adjusting mode for adjusting a focus based on a contrast method.

* * * * *